US009145298B2

(12) United States Patent
Volpi et al.

(10) Patent No.: US 9,145,298 B2
(45) Date of Patent: Sep. 29, 2015

(54) STEAM REFORMER FURNACE, AND METHOD FOR THE SAME (71) Applicant: Stamicarbon B.V., Sittard (NL)

(72) Inventors: Paola Volpi, Rome (IT); Barbara Morico, Rome (IT); Lorena Mosca, Rome (IT); Cristina Guazzotti, Rome (IT); Fabio Prosperi, Rome (IT); Gaetano Iaquaniello, Rome (IT)

(73) Assignee: STAMICARBON B.V., Sittard (NL)

( * ) Notice: Subject to any disclaimer, the term of this patent is extended or adjusted under 35 U.S.C. 154(b) by 0 days.

(21) Appl. No.: 14/386,327

(22) PCT Filed: Mar. 26, 2013

(86) PCT No.: PCT/NL2013/050223
§ 371 (c)(1),
(2) Date: Sep. 18, 2014

(87) PCT Pub. No.: WO2013/147598
PCT Pub. Date: Oct. 3, 2013

(65) Prior Publication Data
US 2015/0048277 A1    Feb. 19, 2015

(30) Foreign Application Priority Data
Mar. 26, 2012   (EP) ..................................... 12161221

(51) Int. Cl.
*B01J 7/00*        (2006.01)
*C01B 3/38*        (2006.01)
*B01J 8/02*        (2006.01)

(52) U.S. Cl.
CPC ..................... *C01B 3/38* (2013.01); *B01J 7/00* (2013.01); *B01J 8/0257* (2013.01);
(Continued)

(58) Field of Classification Search
CPC ............... B01J 7/00; B01J 2208/00221; B01J 2208/0053; B01J 2208/00504; B01J 2208/00309; B01J 2208/0257; C01B 3/384; C01B 3/38; C01B 2230/0811; C01B 2230/1235; C01B 2230/0233
USPC .......................................... 252/373; 48/197 R
See application file for complete search history.

(56) References Cited

U.S. PATENT DOCUMENTS

| 4,216,575 | A | * | 8/1980 | Carnavos et al. ................. 29/597 |
| 5,935,531 | A | * | 8/1999 | Giacobbe ....................... 422/652 |
| 2004/0172877 | A1 | * | 9/2004 | Wunning ..................... 48/102 A |

FOREIGN PATENT DOCUMENTS

| EP | 1193219 | 4/2002 |
| WO | WO-01/12310 | 2/2001 |

OTHER PUBLICATIONS
International Search Report for PCT/NL2013/050223, mailed Aug. 2, 2013, 4 pages.

*Primary Examiner* — Stanley Silverman
*Assistant Examiner* — Syed Iqbal
(74) *Attorney, Agent, or Firm* — Morrison & Foerster LLP (57) ABSTRACT

A reformer furnace (1), comprising: at least one triple conduit assembly (200), including a flue gas conduit (220) enclosing a reaction conduit (240) enclosing a product gas conduit (260), wherein: the reaction conduit (240) extends between a lower end (244) defining a reaction gas inlet (245), and a closed upper end (242); the product gas conduit (260) extends between an upper end (262) defining a product gas inlet (263), and a lower end (264) defining a product gas outlet (265); the flue gas conduit (220) extends between an upper end (222) defining a flue gas inlet (223), and a lower end (224) defining a flue gas outlet (225); and an annulus (250) between the reaction conduit (240) and the product gas conduit (260) comprises a catalyst (252); a combustion chamber (100) that encloses an approximate upper half (226, 246, 266) of the at least one triple conduit assembly (200) while an approximate lower half (228, 248, 268) thereof resides outside of and below the combustion chamber, and that includes at least one burner (110), disposed inside of the combustion chamber and outside of the flue gas conduit (220), such that the approximate upper half (226) of the flue gas conduit substantially shields the reaction conduit (240) from direct burner flame heat radiation and impingement.

15 Claims, 3 Drawing Sheets

(52) U.S. Cl.
CPC ......... *C01B 3/384* (2013.01); *B01J 2208/0053* (2013.01); *B01J 2208/00221* (2013.01); *B01J 2208/00309* (2013.01); *B01J 2208/00504* (2013.01); *B01J 2219/18* (2013.01); *C01B 2203/0233* (2013.01); *C01B 2203/0811* (2013.01); *C01B 2203/1235* (2013.01)

STEAM REFORMER FURNACE, AND METHOD FOR THE SAME

CROSS-REFERENCE TO RELATED APPLICATIONS

This application is the national phase of PCT application PCT/NL2013/050223 having an international filing date of 26 Mar. 2013, which claims benefit of European patent application No. 12161221.2 filed 26 Mar. 2012. The contents of the above patent applications are incorporated by reference herein in their entirety.

FIELD OF THE INVENTION

The present invention relates to a reformer furnace for steam reforming a hydrocarbon feedstock, and to a method for the same.

BACKGROUND

Steam reforming is a chemical process by which a hydrocarbon feedstock reacts with steam to form a product gas mixture comprising hydrogen and carbon oxides. The reaction, which is strongly endothermic, takes place in a reactor called a reformer furnace.

The reformer furnace may typically include a tubular reaction vessel containing a steam reforming catalyst through which the reactant mixture of hydrocarbons and steam (also called: mixed-feed) is flown. The reaction vessel may be wholly or partly disposed inside a combustion chamber of the reformer furnace fitted with a number of burners that combust fuel to produce the heat necessary to sustain the endothermic reforming reaction inside the reaction vessel. Heat may be transferred to the reaction vessel by radiant heat directly from the burner flames, or by convective heat from flue gases that flow past the vessel, either co-current or counter-current to the flow of reactant mixture inside the vessel.

A notorious problem with known reformer furnaces is that both the product gas and the flue gas may exit at relatively high temperatures. In the art various reformer furnace designs have therefore been proposed to improve the overall heat economy of the reforming process by recovering the sensible heat from both the product gas and the flue gas to drive the reforming process, so as to produce additional product gas. These reformer furnace designs, however, appear to leave room for efficiency improvements. Furthermore, they may typically be relatively complex and sizeable, making them costly to construct and maintain.

SUMMARY OF THE INVENTION

It is an object of the present invention to provide for a reformer furnace that is compact, economical to manufacture, maintain and operate, and that offers reduced fuel consumption and $CO_2$-emissions compared to conventional reformer furnaces.

It is another object of the present invention to provide for a method of steam reforming a hydrocarbon feedstock that is more energy efficient than conventional steam reforming processes.

To this end, a first aspect of the present invention is directed to a reformer furnace. The reformer furnace may comprise a triple conduit assembly, including a generally vertically extending flue gas conduit enclosing a reaction conduit enclosing a product gas conduit. The reaction conduit may extend between a lower end defining a reaction gas inlet, and a closed upper end. The product gas conduit may extend between an upper end defining a product gas inlet near the upper end of the reaction conduit, and a lower end defining a product gas outlet at the lower end of the reaction conduit. The flue gas conduit may extend between an upper end defining a flue gas inlet near the upper end of the reaction conduit, and a lower end defining a flue gas outlet near the lower end of the reaction conduit. An annulus between the reaction conduit and the product gas conduit may comprise a steam reforming catalyst. The reformer furnace may also comprise a combustion chamber that encloses an approximate upper half of the triple conduit assembly while an approximate lower half thereof resides outside of and below the combustion chamber. The combustion chamber may include at least one burner, disposed inside of the combustion chamber and outside of the flue gas conduit, such that the approximate upper half of the flue gas conduit substantially shields the reaction conduit from direct burner flame heat radiation and burner flame impingement.

The triple conduit assembly of the reformer furnace defines a structurally simple, yet highly efficient double, full-length (exclusively) counter-current heat exchanger. During operation mixed-feed is flown upwards and counter-current to both the downward flow of hot flue gas within the annulus between the flue gas conduit and the reaction conduit and the downward flow of hot product gas within the product gas conduit. The double countercurrence may preferably exist over substantially the entire length of the triple conduit assembly, or at least over substantially the entire length of the catalyst-containing longitudinal portion of the reaction conduit. While the upward flow of mixed-feed gradually undergoes the endothermic reforming reaction and thus in itself cools down, the downward flows of flue gas and product gas ensure that radial temperature gradients (between, on the one hand, the mixed-feed, and, on the other hand, the flue gas and product gas) are maintained over the length of the reaction conduit to drive a heat flow into the leftover mixed-feed and to thus sustain the reforming reaction. The radial temperature gradients decline only slowly in the downward direction, such that heat for the reforming reaction is efficiently extracted from the flue gases and recovered from the product gas. Besides its efficiency, the design of the furnace offers various other advantages. One advantage of the configuration of the presently disclosed triple conduit assembly is that its reaction gas inlet and product gas outlet are located at the lower end of the assembly. This overcomes the need for extended piping in the top of the furnace, and for scaffolding and other elevated structures necessary to provide access thereto for enabling maintenance. The configuration thus simplifies the design of the furnace, and reduces its construction costs. Furthermore, the approximate upper half of the flue gas conduit, disposed between the burner(s) in the combustion chamber and the reaction conduit, serves as a heat shield and temperature equalizing wall. It protects the reaction conduit from direct burner flame heat radiation and flame impingement that might unevenly heat and/or cause structural damage to the reaction conduit. Accordingly, it avoids the need for early maintenance. Also, as it allows the burners to be placed close the reaction conduit, it additionally enables a more compact design of the reformer furnace.

A second aspect of the present invention is directed to a method of steam reforming a hydrocarbon feedstock. The method may comprise providing a reformer furnace according to the first aspect of the invention. The method may also comprise supplying a mixed-feed of hydrocarbons and steam to the reaction gas inlet of the at least one triple conduit assembly of the reformer furnace, while generating hot flue gas by means of the at least one burner in the combustion chamber thereof, such that the mixed-feed flows upward inside the annulus between the reaction conduit and the product gas conduit, and counter-current to both the downward flow of flue gas within an annulus between the flue gas conduit and reaction conduit and the downward flow of product gas within the product gas conduit.

In a preferred embodiment of the method, the mixed-feed may flow substantially exclusively counter-current to the flue gas and the product gas. Furthermore, the mixed-feed may be exclusively supplied to the reaction gas inlet defined by the lower end of the reaction conduit, and the product gas may be exclusively discharged from the product gas outlet defined by the lower end of the product gas conduit.

These and other features and advantages of the invention will be more fully understood from the following detailed description of certain embodiments of the invention, taken together with the accompanying drawings, which are meant to illustrate and not to limit the invention.

DETAILED DESCRIPTION

Figure 1:
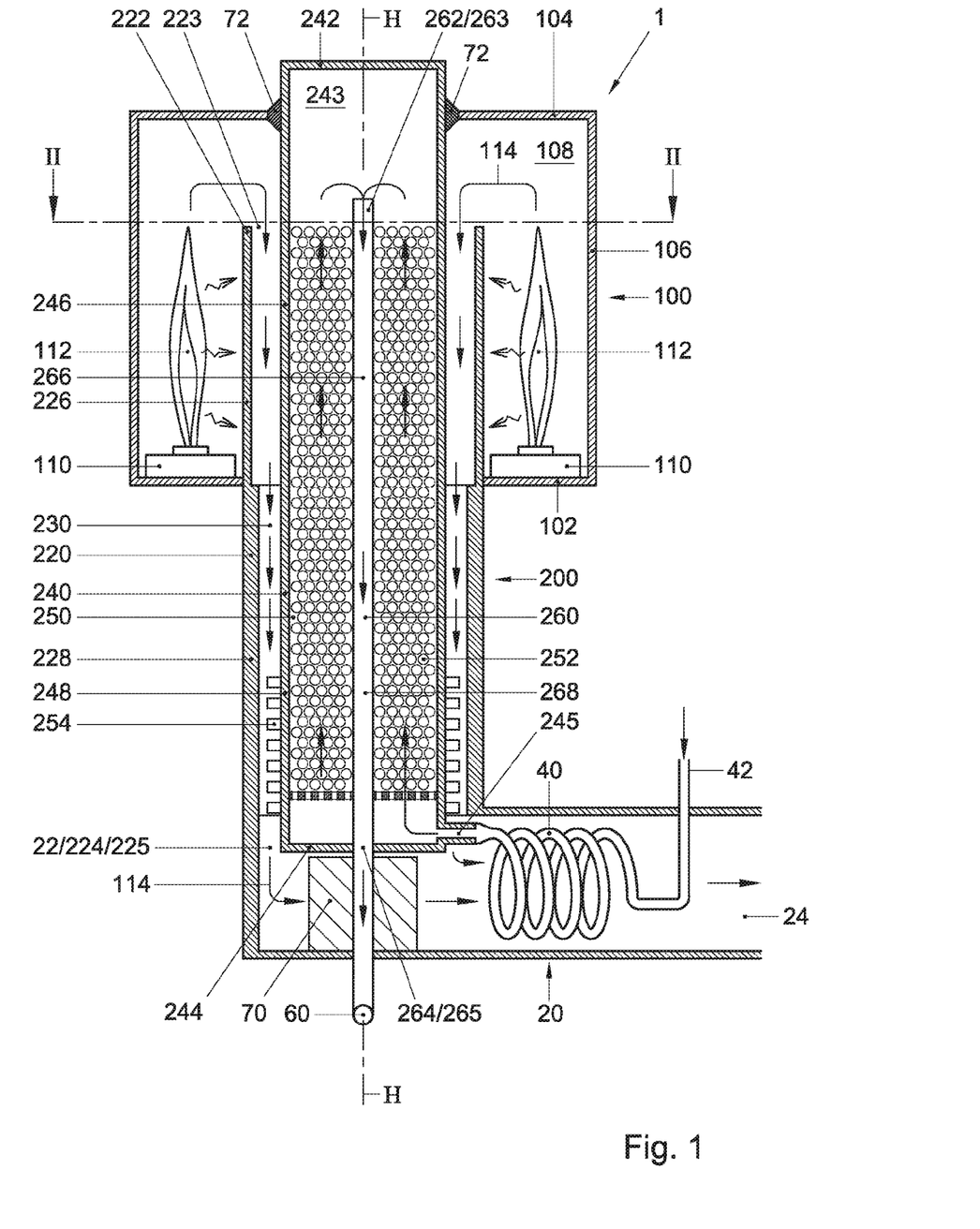
FIG. 1 is a schematic cross-sectional side view of an exemplary reformer furnace according to the present invention.
Figure 2:
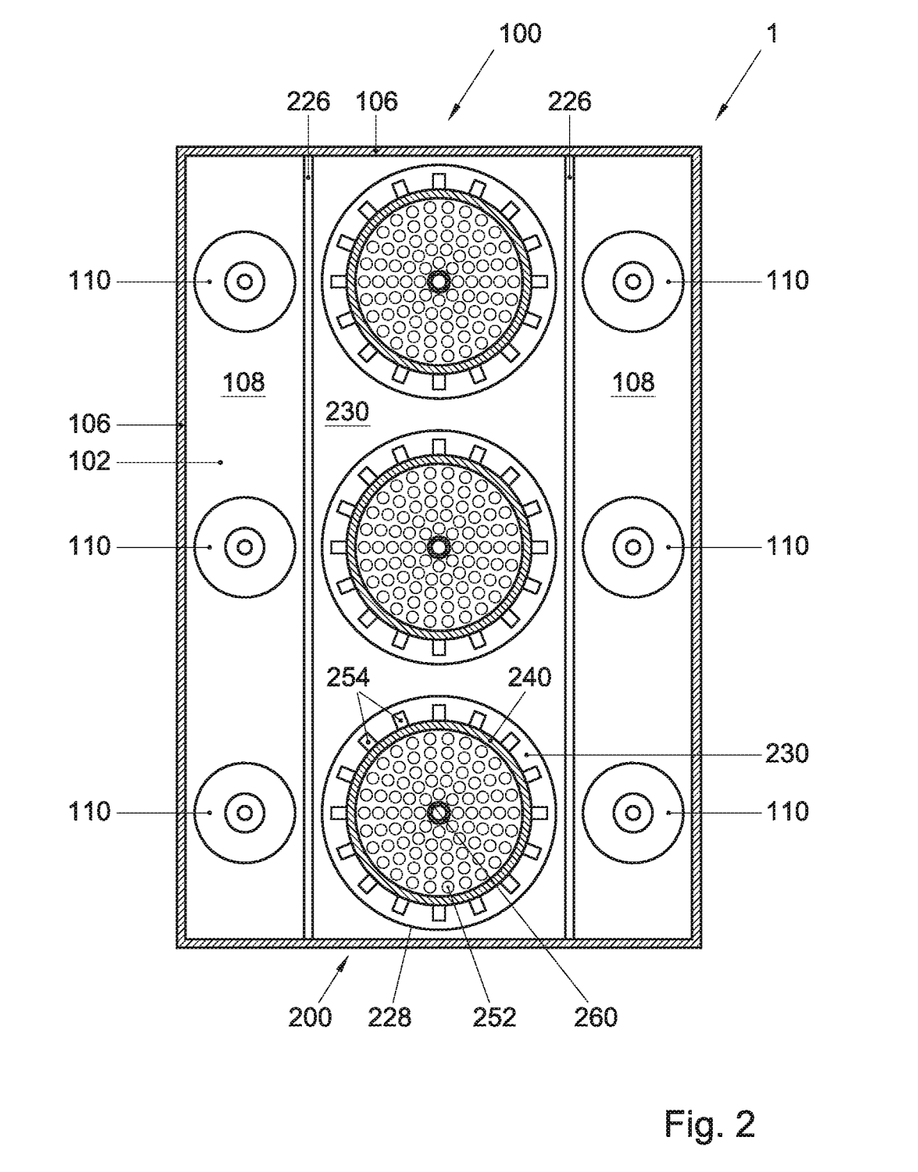
FIG. 2 is a schematic cross-sectional top view of the exemplary reformer furnace of FIG. 1 taken along line II-II.

FIG. 1 is a schematic cross-sectional side view of an exemplary reformer furnace 1 according to the present invention. FIG. 2 is a cross-sectional top view of the reformer furnace 1 shown in FIG. 1, taken along line II-II indicated therein. Hereafter, the reformer furnace 1 according to the present invention will be described in general terms, where appropriate with reference to the exemplary embodiment shown in FIGS. 1 and 2.

The reformer furnace 1 may comprise at least one elongate triple conduit assembly 200. The triple conduit assembly 200 may include a preferably vertically oriented flue gas conduit 220 that encloses or surrounds a reaction conduit 240, which reaction conduit in turn encloses a product gas conduit 260. The three conduits 220, 240, 260 may have an approximately same length, typically in the range of about 10±2 meters (which is about 10-20% shorter than traditional catalyst tubes), and extend along a common vertical axis H. At their ends the conduits 220, 240, 260 need not exhibit axial overlap; i.e. one conduit may have an end that protrudes somewhat from or beyond that of another. The inner two conduits, i.e. the product gas conduit 260 and reaction conduit 240, may collectively be referred to as the '(catalyst) reformer tube'. The outer flue gas conduit 220 may thus enclose the reformer tube 240, 260.

The conduits 220, 240, 260 of the triple conduit assembly 200 may have suitable respective inner and outer cross-sections, which cross-sections may vary in shape and/or dimensions along their length.

In a preferred embodiment, for example, the product gas conduit 260 and/or the reaction conduit 240 may include inner and/or outer cross-sections with a relatively great circumferential area to volume ratio (per unit of conduit length) so as to enhance their heat transfer potential. For the product gas conduit 260 this has been disclosed in WO 01/12310-A1 (Loiacono et al); see in particular FIG. 2A and the discussion thereof. The product gas conduit 260 may thus, for instance, include a star-, slit-, or cross-like cross-section. In one embodiment the product gas conduit 260 may even include multiple, e.g. three or four, parallelly extending subconduits, which—seen along the common axis H—may be arranged on the vertices of a triangle or rhomboid. The heat transfer potential of the reaction conduit 240, in turn, may similarly be enhanced by providing its outer surface with outwardly extending, heat-exchange-surface providing studs, fins or like protrusions 254 that protrude into the annulus 230 between the flue gas conduit 220 and the reaction conduit 240. The protrusions 254 may be provided along the entire length of the reaction conduit 240, but preferably at least, and possibly only, on the approximate lower half 248 thereof. At the approximate lower half 248, where heat convection may be the dominant heat transfer mechanism during operation, the protrusions may be most effective in improving the overall temperature profile of the reaction conduit 240.

In another preferred embodiment, the product gas conduit 260 may, either in addition to or as an alternative to a heat transfer potentional increasing cross-section, contain/be fitted with a heat transfer promoter. The heat transfer promoter may, for instance, comprise randomly packed inert objects, e.g. alumina spheres, which cause or increase turbulence within the product gas in the conduit 260 and thereby promote heat transfer from the product gas to the mixed-feed flowing through the reaction conduit 240.

In case the reformer furnace 1 includes a plurality of triple conduit assemblies 200, the flue gas conduits of adjacent triple conduit assemblies 200 may be wholly or partly merged into a common or shared flue gas conduit 220 for constructional efficiency. The reformer furnace 1 of FIGS. 1-2, for instance, includes three triple conduit assemblies 200, as can be seen in FIG. 2. The approximate upper halves 226 of the flue gas conduits of adjacent assemblies 200 have been combined to form a common approximate upper half of a (thus partly common) flue gas conduit 220 that encloses the approximate upper halves 246, 266 of all three respective reformer tubes 240, 260. The approximate lower halves 228 of the flue gas conduits 220 of three assemblies 200 have remained separate, such that each still encloses the approximate lower half 248, 268 of only one reformer tube 240, 260. Due to the combination of the upper halves of the flue gas conduits, the resulting flue gas conduit 220 has a cross-section that varies along its length: the common approximate upper half of the flue gas conduit 200 has a wide rectangular cross-section, while each of the respective approximate lower halves 228 has a circular cross-section that snugly fits around the outer circumference of the approximate lower half 248 of a respective reaction tube 240. It will be clear that this means that the flue gas conduit 220 effectively narrows in the downward direction. As a result flue gas flowing downward through the flue gas conduit 220 will speed up and enable a higher heat transfer rate. A ratio between the effective widths of the approximate upper and lower halves of the flue gas conduit may preferably be in the range 2-5, and more preferably 3.5+/−15%.

The arrangement of the conduits of a triple conduit assembly 200 may generally be such that the reaction conduit 240 extends between a lower end 244 defining a reaction gas inlet 245, and a closed upper end 242. I.e. the reaction conduit 240 may be a cul-de-sac for process gases. The product gas conduit 260, enclosed inside the reaction conduit 240, may extend between a product gas inlet 263 that is disposed near the upper end 242 of the reaction conduit 240, and a product gas outlet 265 disposed at the lower end 264 of the reaction conduit. While the upper end 262 of the product gas conduit 260 may be disposed inside a head space 243 defined by a top section of the reaction conduit 240, the product gas outlet 265 may be formed as a passage through a wall of a bottom section of the reaction conduit 240. Accordingly, a continuous process gas flow path having two essentially parallel legs may be defined through the reformer tube 240, 260. The first leg may extend through the annulus 250 between the reaction conduit 240 and the product gas conduit 260, from the reaction gas inlet 245 to the head space 243 of the reaction conduit 240, and the second leg may extend through the product gas conduit 260, from the product gas inlet 263 within the head space 243 of the reaction conduit 240 to the product gas outlet 265. The reformer tube 240, 260, in turn, may be enclosed by the flue gas conduit 220 such that an annulus or space 230 is defined between the flue gas conduit 220 and the reaction conduit 240, which annulus extends over substantially an entire length of the reformer tube 240, 260, from a flue gas inlet 223 near the upper end 242 of the reformer tube 240, 260 to a flue gas outlet 225 near the lower end 244 of the reformer tube 240, 260. Hence, the triple conduit assembly 200 may define three parallel flow path sections, which, as will be clarified below, may be considered to form a double full-length counter-current heat exchanger.

An advantage of the above-described triple conduit-arrangement is that the external in- and outlets of the reformer tube 240, 260, i.e. reaction gas inlet 245 and the product gas outlet 265, are both located near the lower end thereof. This overcomes the need for extended piping in the top of the furnace 1, and for scaffolding and other elevated structures necessary to provide access thereto so as to enable maintenance thereof. The arrangement thus simplifies the design of the furnace 1, and reduces its construction and maintenance costs. Another advantage of the arrangement is that upper portions of the reformer tubes 240, 260 are free from (fluid) connections, and may extend through a ceiling 104 of the combustion chamber 100 (and possibly through a roof of a building in which the combustion chamber 100 is disposed), so as to allow for free thermal expansion of the tubes in the upward direction. This point will be elucidated in some more detail below.

The conduits 220, 240, 260 of the triple conduit assembly 220 may be made of any material capable of withstanding the high temperatures, stress and chemically aggressive environment to which they may be exposed during operation. The conduits 240, 260 of the reformer tube may, for example, be made of metal, such as centrifugally cast austenitic stainless steel, while the flue gas conduit 220 may be made of (heat conductive) high emissivity metal, e.g. a nickel alloy such as NICROFER 6025HT, or include a refractory wall optionally at least partially coated with high emissivity materials. In some embodiments, an outer side of the flue gas conduit 220 facing the burners may be of a different material than the inner side facing the reformer tube 240, 260. Since the approximate upper half 246, 266 of the reformer tube 240, 260 will be exposed to higher temperatures than its approximate lower half 248, 268, upper sections—e.g. the approximate upper halves 246, 266—of the reaction conduit 240 and/or the product gas conduit 260 may be made of different (typically more resistive, and therefore more expensive) materials than lower sections—e.g. the respective approximate lower halves 248, 268—and/or have a different (typically larger) conduit wall thickness than these lower sections. In one embodiment, for example, the approximate upper half 246 of the reaction conduit 240 may be made of 35Cr45NiNb Microalloy and have a minimum sound wall (MSW) thickness of 10 mm, while the corresponding lower half 248 may be manufactured from 25Cr-20Ni (Gr HK40) and have an MSW thickness of 6 mm. The construction material of the flue gas conduit 220 may similarly vary along its height.

In one embodiment, all three conduits 220, 240, 260 of the triple conduit assembly 200 may be formed integrally. In another embodiment, the reaction conduit 240 and the product gas conduit 260 may define an integral (i.e. one-piece) catalyst reformer tube, while the flue gas conduit 260 may be formed separately, for example as part of the wall structure of the combustion chamber 100 to be described below.

To enhance the reforming reaction that may take place in the reformer tube 240, 260 during operation, the annulus 250 between the reaction conduit 240 and the product gas conduit 260 may be wholly or partly filled with a steam reforming catalyst 252, such as, for example, promoted or non-promoted nickel oxide catalyst pellets. In a preferred embodiment, both the longitudinal portion of the annulus 250 between the approximate lower half of the reaction conduit 248 and the approximate lower half of the product gas conduit 268 and the longitudinal portion of the annulus 250 between the approximate upper half of the reaction conduit 246 and the approximate upper half of the product gas conduit 266 may be at least partly filled with the steam reforming catalyst 250. This may enable steam reformation in both the convective section and the radiant section of the furnace 1. In some embodiments, the product gas conduit 260 may also be wholly or partly filled with such a catalyst in order to facilitate the reforming reaction of any mixed-feed residue not reformed on its passage through the annulus 250.

In addition to the at least one triple conduit assembly 200, the reformer furnace 1 may comprise a combustion chamber 100. The combustion chamber 100 may be defined by a lower wall or floor 102, an upper wall or ceiling 104, and a side wall 106 that interconnects the lower and upper walls 102, 104 to define a confined interior combustion chamber space 108. The triple conduit assembly 200 may be partly enclosed by the combustion chamber 100, preferably such that an approximate upper half 226, 246, 266 of the triple conduit assembly 200 is received/disposed inside of the combustion chamber space 108, while the approximate lower half 224, 244, 264 resides outside of and below the combustion chamber 100.

In one embodiment, each triple conduit assembly 200 as a whole (if all three conduits of the triple conduit-assemblies are integrally formed), or each respective reformer tube 240, 260 thereof (if the reformer tubes are integrally formed, but non-integral with the flue gas conduits) may be suspended by, respectively supported at, one of its ends. In the depicted embodiment, for example, the reformer tubes 240, 260 of the respective triple conduit assemblies 200 are integrally formed, and supported at their respective lower ends, specifically at the lower ends of their reaction conduits 240, by a reformer tube support 70. The reformer tube support 70 bears substantially the entire weight of the reformer tubes 240, 260. At the same time, upper portions of the reformer tubes 240, 260 extend through the ceiling 104 of the combustion chamber 100, slidably guided by optionally flue gas-sealing side supports 72 provided therein. Thus one-sidedly vertically suspending or supporting the triple conduit-assemblies 200 or their reformer tubes 240, 260 enables a stable arrangement capable of accommodating one way (namely substantially vertical) thermal expansion of the suspended/supported conduits. Because of the one way thermal expansion, the one-sided suspension or support of in particular the reformer tubes 240, 260 may also facilitate the placement of the reaction gas inlet 245 and the product gas outlet 265 at the suspensed or supported side; this side may, after all, be essentially fixed in space.

The combustion chamber 100 may accommodate a heat source, typically in the form of one or more burners 110. The burners 110 may be configured to combust fuel in order to generate a flue gas having a temperature of at least 1000° C., and preferably a temperature in the range of about 1200-1400° C. The burners 100 may be mounted on any of the walls 102, 104, 106 of the combustion chamber 100, and may preferably be mounted on the floor 102 as upward flaming burners, at a position relatively close to or in abutment with the outside of the flue gas conduit 220 that protrudes into the combustion chamber 100. The arrangement and configuration of the burners 110 may in particular be such that any flames 112 they produce while combusting fuel do not cause direct radiant heating of the reformer tube 240, 260. I.e. by appropriate placement and adjustment of the burners 110, the approximate upper half 226 of the flue gas conduit 220 may be configured to act as a shield or screen between the burner flames 112 and the reformer tube 240, 260, and protect the reformer tube 240, 260 against flame impingement and direct radiant heat. On the one hand this may reduce thermal peak loads on the approximate upper half 246, 266 of the reformer tube 240, 260 (and thus avoid heat spot formation, conduit deformation and consequential early failure, e.g. rupture, of reformer tube), and enable its construction at a smaller conduit wall thickness. On the other hand, the relatively small spacing between the burners 110 and the reformer tube 240, 260, made possible by the interposition of the approximate upper half 226 of the flue gas conduit 220, may allow the combustion chamber 100 to be built very compactly. In the concrete, a distance between burners 110 and a centerline of a reformer tube 240, 260 may, for instance, be reduced from typical values of 1100-1300 mm for traditional steam reformers to 800-1000 mm for presently disclosed design.

One embodiment of the presently disclosed reformer furnace 1 may include a plurality of triple conduit assemblies 200, which may be spaced apart in at least one row, with their longitudinal axes H in parallel. For simplicity, the depicted embodiment of the furnace 1 includes only one such row (see FIG. 2), but it will be clear that a furnace 1 may generally include a plurality of rows, each including a plurality of typically equidistantly spaced-apart triple conduit assemblies 200. The approximate upper halves 226 of the flue gas conduits 220 of the triple conduit assemblies 200 in the at least one row may be combined or merged to define a common approximate upper half of a thus partly common flue gas conduit. The common approximate upper half of the partly common flue gas conduit may preferably be at least partially defined by two substantially planar walls that extend in parallel, and on opposite sides, alongside the row of triple conduit assemblies 200. In one embodiment, such as that depicted in FIGS. 1-2, the planar walls may extend upwards from the lower wall 102 of the combustion chamber 100. The walls may, for instance, be made of metal sheet or refractory/SiC-bricks.

It is understood that the planar walls may act as heat distributors that, in use, assume a generally flat temperature profile to promote the uniform heating of the approximate upper halves of the reformer tubes 240, 260. However, their configuration should be distinguished from that of the tubular heat distributors disclosed in U.S. Pat. No. 5,935,531 (Giacobbe). In US '531, each tubular catalytic vessel (10) is uniquely associated with a tubular heat distributor (16). In comparison, the planar geometry of the presently proposed heat distributing walls is more advantageous as it allows the pitch/distance between adjacent reformer tubes 240, 260 to be made smaller, and, consequently, also the plot plan area/footprint of the furnace 1.

In one embodiment, each triple conduit assembly 200 in the at least one row may be associated with two burners 110, which may be disposed outside of the planar walls, and diametrically opposite to each other relative to (a longitudinal axis H of) a reformer tube of a respective triple conduit assembly 200. An imaginary line interconnecting the two burners 110 associated with a respective triple conduit assembly 200 may preferably extend substantially perpendicular to the planar walls, as in the embodiment of FIGS. 1-2.

To enable the inflow and outflow of gasses into and from the reformer furnace 1, additional fluid supply and discharge conduits may be provided. The flue gas outlet 225 of the flue gas conduit 220, for example, may be connected to a flue gas discharge conduit 20; the flue gas discharge conduit may be common to all triple conduit assemblies 200 of the reformer furnace 1. In addition, the product gas outlet 265 of the product gas conduit 260 of each of the assemblies 200 may be connected to a common product gas discharge conduit 60. The reaction gas inlet 245 of the reaction conduit 240 of each of the assemblies 200 may be connected to a common mixed-feed pre-heat conduit, for example in the form of a coil 40. The coil 40 may extend within the flue gas discharge conduit 20, preferably such that its axis extends parallel to the flow direction 114 of the flue gas therein, so as to enable preheating of the mixed-feed flowing through the windings of the coil 40 that extend substantially transverse to the flow direction 114. Like the mixed-feed, combustion fuel and/or combustion air for the burners 110 may be preheated by guiding it through the flue gas discharge conduit 20 before supplying it to the burners 110.

Now that the construction of the reformer furnace 1 according to the present invention has been described in some detail, attention is invited to its operation.

When the furnace 1 is in use, the burners 110 inside the combustion chamber 100 may combust fuel, thereby heating the common approximate upper half 226 of the flue gas conduit 200 that shields the reformer tube 240, 260 from thermal radiation, and producing flue gases with a typical temperature in the range of about 1200-1400° C. The flue gases may naturally flow upward, and then, due to the build-up of pressure inside the combustion chamber 100, downward into the upper end 223 of the common approximate upper half of the flue gas conduit 220, and further through the space(s) 230 between the flue gas conduit 220 and the reaction conduits 240. The up- and downward flow of flue gases along the outside and inside of the approximate upper half 226 of the flue gas conduit 220, respectively, together with the radiant heat absorbed thereby, may cause the approximate upper half 226 of the flue gas conduit 220 to assume a generally flat temperature profile. Accordingly, the approximate upper half 226 of the flue gas conduit 220 may emit thermal radiation towards the approximate upper half 246, 266 of the reformer tube 240, 260 in order to heat it substantially uniformly over its length. For the approximate upper halves of the triple conduit assemblies 200, radiation may be the primary source of heat. For the approximate lower halves of the triple conduit assemblies 200, on the other hand, convection may be the primary heat transfer mechanism. The convective heating of the reaction conduits 240 may be effected by the flue gases flowing downward through the annuli 230 between the flue gas conduits 220 and the reaction conduits 240. The heat transfer rate may be enhanced by a downwardly narrowing inner cross-sectional profile of the flue gas conduits 220, and the use of radially outwardly protruding heat fins or studs 254 on the outside of the reaction tubes 240.

Figure 3A:
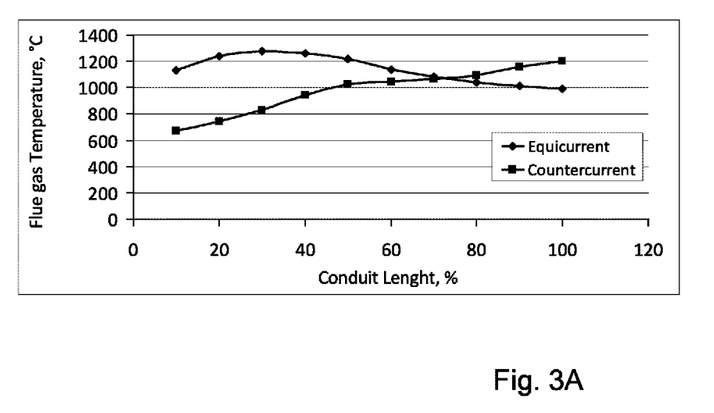
FIGS. 3A-B schematically illustrate, respectively, a flue gas temperature profile and a heat flux profile comparison (profile along the length of the reaction conduit) between the double counter-current configuration according to the present invention and a conventional single equicurrent configuration.
Figure 3B:
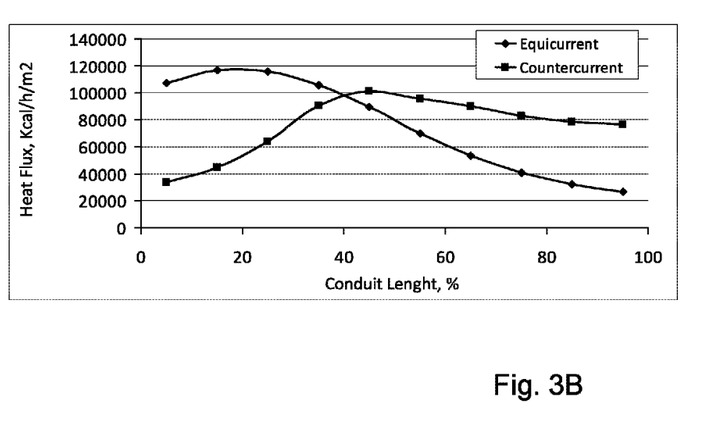

FIGS. 3A-B schematically illustrate, respectively, a flue gas temperature profile and a heat flux profile comparison between a double counter-current configuration according to the present invention and a conventional equi-current configuration featuring a single reaction conduit 240 that is disposed in a top-fired box type combustion chamber, and along which flue gas is flown in the downward direction co-current with the mixed-feed through the reaction conduit. In either case, the profiles are taken along the length of the reaction conduit, '0% conduit length' indicating a position at the mixed-feed inlet end 245, '100% conduit length' indicating a position at the downstream end of reaction conduit 242 (which in the configuration according to the invention is closed, and marks the inlet 263 of the inner product gas conduit 260). It is evident that, in case of a same average heat flux, the equi-current configuration has a significantly higher heat flux peak/load, i.e. $116 \cdot 10^3$ kcal/h/m² vs. $101 \cdot 10^3$ kcal/h/m². Consequently, the double counter-current configuration may be designed with a higher average heat flux (+18% for the case illustrated, and typically about 10-20%), with a parallel reduction of the heat transfer surface of the reaction conduit 240: i.e. the reaction conduit may be made shorter/more compact without loss of functionality. —With an eye to FIGS. 3A-B, it may be noted that the presently disclosed reformer furnace 1 behaves more like a conventional side-fired reformer furnace than a conventional top-fired furnace. Yet, while it possesses the advantages of a side-fired reformer furnace, e.g. a more controlled/uniform temperature distribution along the reformer tubes, it does not possess its disadvantages, e.g. a large number of burners and a large footprint/plot plan area.

Continuing with the operation of the furnace 1: a mixed-feed of hydrocarbons and steam may be provided to the inlet 42 of the mixed-feed pre-heat coil 40. The flow of mixed-feed through the coil 40 may cause the flue gases flowing past the coil 40 to cool down and the mixed-feed to warm up, for instance to a temperature in the range of about 520-570° C. From the pre-heat coil 40 the mixed-feed is supplied to the reaction gas inlets 245 of the reaction conduits 240 of the triple conduit assemblies 200. Within a reaction conduit 240 of a triple conduit assembly 200, the mixed-feed flows upwards through the annulus 250 between the reaction conduit 240 and the product gas conduit 260, and through the catalyst bed 252 present therein. During its upward flow, the mixed-feed in the annulus 250 is heated, firstly (i.e. in the convective section/approximate lower half 248 of the reaction conduit 240) through convective heating by the flue gases from the outside and the product gas from the inside, and secondly (i.e. in the radiant section/approximate upper half 246 of the reaction conduit 240) additionally, and in fact primarily, through uniform radiant heating by the approximate upper half 226 of the flue gas conduit 220. When the mixed-feed attains a temperature of about 840-880° C. the hydrocarbons react with the steam to form the product gas mixture, comprising hydrogen and carbon oxides. Notably, the relatively low and controlled heat flux values in the convective section of the reformer furnace 1 prevent coke formation, a problem often encountered in conventional top-fired furnaces. Once the product gas arrives in the head space 243 of the reaction conduit 240, and substantially all hydrocarbons have reacted, the flow direction of the product gas may reverse (because the upper end 242 of the reaction conduit is closed) and pass downwardly into the product gas conduit 260, from which it may eventually be discharged via the common product gas discharge conduit 60.

It should be noted that over substantially the entire length of the annulus 250 between the reaction conduit 240 and the product gas conduit 260, the upward flow of the mixed-feed is counter-current to both the downward flow of flue gas within the annulus 230 between the flue gas conduit 220 and reaction conduit 240, and the downward flow of product gas within the product gas conduit 260. Consequently, heat for the reforming reaction is efficiently extracted from the flue gases and recovered from the product gas. The efficiency of the furnace 1 is further enhanced by the preheating of the mixed-feed before it enters the reaction conduit 240. Accordingly, the amount of fuel burnt per unit of hydrogen yield, and the corresponding $CO_2$-emissions, may typically be 10-20% lower than with conventional reformer furnaces. Both the flue gas temperature at the outlet 24 of the flue gas discharge duct 20 and the product gas temperature at the product gas outlet 265 may be well below 700° C. Such an exit temperature reduces the need for additional heat recovery equipment (which would merely serve to generate low quality export steam) and thus compacts the design of the reformer furnace and lowers its manufacturing costs.

As regards the terminology used in this text, the following should be noted. The word 'vertical' may be interpreted to refer to a direction that includes an angle in the range of 90±10° with the horizontal. The terms 'approximate upper half' and 'approximate lower half' in relation to the triple conduit assembly may be interpreted to refer to a longitudinal portion of the assembly covering 50±20% (i.e. between 30% and 70%), and preferably 50±10% of the length of the assembly.

Although illustrative embodiments of the present invention have been described above, in part with reference to the accompanying drawings, it is to be understood that the invention is not limited to these embodiments. Variations to the disclosed embodiments can be understood and effected by those skilled in the art in practicing the claimed invention, from a study of the drawings, the disclosure, and the appended claims. Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, it is noted that particular features, structures, or characteristics of one or more embodiments may be combined in any suitable manner to form new, not explicitly described embodiments.

LIST OF ELEMENTS 1 reformer furnace
20 (common) flue gas discharge conduit
22 inlet of flue gas discharge conduit
24 outlet of flue gas discharge conduit
40 reaction gas pre-heat conduit/coil
42 inlet of reaction gas pre-heat conduit/coil
60 (common) product gas discharge conduit
70 reformer tube support
72 reformer tube side support
100 combustion chamber
102 lower wall of combustion chamber
104 upper wall of combustion chamber
106 side wall of combustion chamber
108 combustion chamber space
110 burner
112 burner flame 114 flue gas flow direction
200 triple conduit assembly
220 flue gas conduit
222 upper end of flue gas conduit
223 flue gas inlet
224 lower end of flue gas conduit
225 flue gas outlet
226 approximate upper half of flue gas conduit
228 approximate lower half of flue gas conduit
230 space/annulus between flue gas conduit and reaction conduit
240 reaction conduit
242 closed upper end of reaction conduit
243 head space
244 lower end of reaction conduit
245 reaction gas inlet
246 approximate upper half of reaction conduit
248 approximate lower half of reaction conduit
250 annulus between reaction conduit and product gas conduit
252 steam reforming catalyst
254 heat-exchange-surface providing protrusion
260 product gas conduit
262 upper end of product gas conduit
263 product gas inlet
264 lower end of product gas conduit
265 product gas outlet
266 approximate upper half of product gas conduit
268 approximate lower half of product gas conduit
H common central axis of triple conduit assembly

We claim:

1. A reformer furnace (1), comprising:
at least one triple conduit assembly (200), including a flue gas conduit (220) enclosing a reaction conduit (240) enclosing a product gas conduit (260), wherein:
the reaction conduit (240) extends between a lower end (244) defining a reaction gas inlet (245), and a closed upper end (242);
the product gas conduit (260) extends between an upper end (262) defining a product gas inlet (263), and a lower end (264) defining a product gas outlet (265);
the flue gas conduit (220) extends between an upper end (222) defining a flue gas inlet (223), and a lower end (224) defining a flue gas outlet (225); and
an annulus (250) between the reaction conduit (240) and the product gas conduit (260) comprises a catalyst (252);
a combustion chamber (100) that encloses an approximate upper half (226, 246, 266) of the at least one triple conduit assembly (200) while an approximate lower half (228, 248, 268) thereof resides outside of and below the combustion chamber, and that includes at least one burner (110), disposed inside of the combustion chamber and outside of the flue gas conduit (220), such that the approximate upper half (226) of the flue gas conduit substantially shields the reaction conduit (240) from direct burner flame heat radiation and impingement,
wherein the combustion chamber (100) is at least partly defined by a lower wall (102) through which the approximate upper half (226, 246, 266) of the at least one triple conduit assembly (200) protrudes into the combustion chamber,
and wherein the burner (110) is an upward-flaming burner, disposed on said lower wall (102).

2. The reformer furnace according to claim 1, wherein the reaction conduit (240) and the product gas conduit (260) of the at least one triple conduit assembly (200) define an integrally formed reformer tube.

3. The reformer furnace according to claim 2, wherein a weight of the reformer tube (240, 260) is substantially supported from below.

4. The reformer furnace according to claim 1, wherein an average inner cross-sectional area of the approximately upper half (226) of the flue gas conduit (220) of the at least one triple conduit assembly (200) is greater than an average inner cross-sectional area of the approximately lower half of the flue gas conduit.

5. The reformer furnace according to claim 1, wherein the approximate upper half (226) of the flue gas conduit (220) of the at least one triple conduit assembly (200) is made of at least one of: metal sheet and refractory.

6. The reformer furnace according to claim 1, comprising a plurality of triple conduit assemblies (200), wherein the approximate upper halves (226) of the flue gas conduits (220) of said plurality of assemblies are combined into one common approximate upper half flue gas conduit.

7. The reformer furnace according to claim 1, wherein an upper portion of the reaction conduit (240) of the at least one triple conduit assembly (200) is made of a different material than a lower portion of the reaction conduit.

8. The reformer furnace according to claim 1, wherein an upper portion of the reaction conduit (240) of the at least one triple conduit assembly (200) has an average conduit wall thickness that is greater than that of a lower portion of the reaction conduit.

9. The reformer furnace according to claim 1, wherein an approximate lower half (248) of the reaction conduit (240) of the at least one triple conduit assembly (200) is provided with surface-enlarging protrusions (254) that extend from an outer surface of the reaction conduit (240) into an annulus (230) between the flue gas conduit (220) and the reaction conduit (240).

10. The reformer furnace according to claim 1, further comprising:
a flue gas discharge conduit (20), connected to the flue gas outlet (225) of the triple conduit assembly (200) and configured to discharge flue gas in a flue gas discharge direction (114);
a reaction gas pre-heat conduit (40), connected to the reaction gas inlet (245) of the triple conduit assembly (200) and having at least a portion that is disposed inside the flue gas discharge conduit (20).

11. The reformer furnace according to claim 1, wherein said at least one triple conduit assembly comprises a plurality of triple conduit assemblies (200) that are arranged in parallel and spaced apart in at least one row, and
wherein the flue gas conduits of the triple conduit assemblies (200) in said at least one row have a common approximate upper half that is at least partially defined by two planar walls that extend in parallel, and on opposite sides, alongside the approximate upper halves of the reaction conduits of said plurality of triple conduit assemblies.

12. The reformer furnace according to claim 11, wherein each triple conduit assembly (200) in said at least one row is associated with two burners (110), which are disposed outside of the planar walls and, diametrically opposite to each other relative to a respective triple conduit assembly, such that a line interconnecting the two burners associated with a respective triple conduit assembly extends substantially perpendicular to the planar walls.

13. A method of steam reforming a hydrocarbon feedstock, comprising:

provi­ding a reformer furnace (1) according to claim 1;

supplying a mixed-feed of hydrocarbons and steam to the reaction gas inlet (245) of the at least one triple conduit assembly (200) of the reformer furnace (1), while generating hot flue gas by means of the at least one burner (110) in the combustion chamber (100) thereof, such that the mixed-feed flows upward inside the annulus (250) between the reaction conduit (240) and the product gas conduit (240), and counter-current to both the downward flow of flue gas within an annulus (230) between the flue gas conduit (220) and reaction conduit (250) and the downward flow of product gas within the product gas conduit (260).

14. The method according to claim 13, wherein the mixed-feed flows substantially exclusively counter-current to the flue gas and the product gas.

15. The method according to claim 13, wherein the mixed-feed is exclusively supplied to the reaction gas inlet (245) defined by the lower end (244) of the reaction conduit (240), and the product gas is exclusively discharged from the product gas outlet (265) defined by the lower end (264) of the product gas conduit (260).

\* \* \* \* \*